US012726579B2

(12) United States Patent
Sato et al.

(10) Patent No.: US 12,726,579 B2
(45) Date of Patent: Sep. 1, 2026

(54) IMAGE READING DEVICE, IMAGE FORMING APPARATUS, NON-TRANSITORY COMPUTER READABLE MEDIUM STORING IMAGE READING PROGRAM, AND IMAGE READING METHOD COMPRISING A SWITCHING MECHANISM TO SWITCH THE TRAVELING OF LIGHT FROM A LIGHT SOURCE TO AN OPTICAL PATH DIRECTLY IRRADIATING A DOCUMENT OR VIA A TRAVELING CHANGE MEMBER

(71) Applicant: FUJIFILM Business Innovation Corp., Tokyo (JP)

(72) Inventors: Takaharu Sato, Kanagawa (JP); Kenji Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/874,297

(22) Filed: Jul. 27, 2022

(65) Prior Publication Data

US 2023/0308575 A1 Sep. 28, 2023

(30) Foreign Application Priority Data

Mar. 23, 2022 (JP) ................................ 2022-047439

(51) Int. Cl.
*H04N 1/04* (2006.01)
*H04N 1/028* (2006.01)

(52) U.S. Cl.
CPC ....... *H04N 1/02895* (2013.01); *H04N 1/0282* (2013.01); *H04N 2201/0432* (2013.01)

(58) Field of Classification Search
CPC ............... H04N 1/0282; H04N 1/0285; H04N 1/02895; H04N 1/0301; H04N 1/1013; H04N 2201/0432
(Continued)

(56) References Cited

U.S. PATENT DOCUMENTS 5,966,221 A 10/1999 Tellam et al.
2006/0210295 A1* 9/2006 Nakaya .............. G03G 15/5062 399/75
(Continued)

FOREIGN PATENT DOCUMENTS

JP H11168607 6/1999
JP 2003015069 1/2003
(Continued)

OTHER PUBLICATIONS

For. Pub Kimura (Year: 2004).*
(Continued)

*Primary Examiner* — Chad Dickerson
(74) *Attorney, Agent, or Firm* — JCIPRNET

(57) ABSTRACT

An image reading device includes a single light source that irradiates an image reading target with light, a traveling change member that changes a traveling direction of the light from the light source and irradiates the image reading target with the light at an incidence angle different from an incidence angle of the light directly applied from the light source to the image reading target, and a switching mechanism that switches traveling of the light from the light source to an optical path for directly irradiating the image reading target or an optical path for irradiating the image reading target via the traveling change member.

11 Claims, 7 Drawing Sheets

(58) Field of Classification Search
USPC ................ 358/482, 400–405, 475, 500–505; 382/294
See application file for complete search history.

(56) References Cited

U.S. PATENT DOCUMENTS

| | | | | |
|---|---|---|---|---|
| 2006/0215933 | A1* | 9/2006 | Nakaya | H04N 1/03 382/294 |
| 2015/0307311 | A1* | 10/2015 | Ono | G03G 15/6552 271/176 |
| 2021/0302154 | A1* | 9/2021 | Hiramatsu | G01N 21/8851 |

FOREIGN PATENT DOCUMENTS

| | | | | |
|---|---|---|---|---|
| JP | 2004274298 | A | * | 9/2004 |
| JP | 2011217270 | | | 10/2011 |
| JP | 2011234246 | | | 11/2011 |
| JP | 5513246 | | | 6/2014 |
| JP | 2020053773 | | | 4/2020 |
| JP | 2020053773 | A | * | 4/2020 |

OTHER PUBLICATIONS

"Office Action of Europe Counterpart Application", issued on Apr. 15, 2024, p. 1-p. 5.
"Search Report of Europe Counterpart Application", issued on Jan. 2, 2023, pp. 1-8.
"Notice of Reasons for Refusal of Japan Counterpart Application", issued on Jan. 27, 2026, with English translation thereof, p. 1-p. 8.
"Office Action of Europe Counterpart Application No. 22199574.9", issued on Mar. 12, 2026, p. 1-p. 6.

* cited by examiner

IMAGE READING DEVICE, IMAGE FORMING APPARATUS, NON-TRANSITORY COMPUTER READABLE MEDIUM STORING IMAGE READING PROGRAM, AND IMAGE READING METHOD COMPRISING A SWITCHING MECHANISM TO SWITCH THE TRAVELING OF LIGHT FROM A LIGHT SOURCE TO AN OPTICAL PATH DIRECTLY IRRADIATING A DOCUMENT OR VIA A TRAVELING CHANGE MEMBER

CROSS-REFERENCE TO RELATED APPLICATIONS

This application is based on and claims priority under 35 USC 119 from Japanese Patent Application No. 2022-047439 filed Mar. 23, 2022.

BACKGROUND

(i) Technical Field

The present disclosure relates to an image reading device reading an image, an image forming apparatus including the image reading device, a non-transitory computer readable medium storing an image reading program, and an image reading method.

(ii) Related Art

JP5513246B discloses an image reading device that reads an original document image having different glossiness or an original document image in which different gloss regions are present in an identical original document, the image reading device including a platen on which an image original document is set, a specular reflection light source photoelectrically converting specular reflection light of the original document image, a diffused light source photoelectrically converting diffused reflected light of the original document image, a photoelectric conversion unit photoelectrically converting reflected light from the original document image on the platen, a control unit executing specular reflection reading of the original document image irradiated with light from the specular reflection light source and diffused reflection reading of the original document image irradiated with light from the diffused light source, and an output value correction unit correcting respective output values at specular reflection and diffused reflection from the photoelectric conversion unit to values appropriate for reading, in which and the output value correction unit is provided with a correction value generation unit that generates a maximum output reference value set from an output value of the photoelectric conversion unit that irradiates a high glossiness reference surface with the light from the specular reflection light source, a first minimum output reference value set from an output value of the photoelectric conversion unit that irradiates a low glossiness reference surface with the light from the specular reflection light source, a second minimum output reference value set from a dark output value of the photoelectric conversion unit, first correction data based on the first minimum output reference value and the maximum output reference value, and second correction data based on the second minimum output reference value and the maximum output reference value, and the control unit is configured to be able to select whether correction is performed by using the first correction data or the second correction data during execution of the specular reflection reading of the original document image.

SUMMARY

Incidentally, it is possible to obtain image information for each incidence angle by causing light from a plurality of light sources to be incident to an image reading target at different angles, but since the plurality of light sources are used, the cost tends to increase.

Aspects of non-limiting embodiments of the present disclosure relate to an image reading device capable of reducing cost compared with a configuration in which light is incident to an image reading target from a plurality of light sources at different angles.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image reading device including a single light source that irradiates an image reading target with light; a traveling change member that changes a traveling direction of the light from the light source and irradiates the image reading target with the light at an incidence angle different from an incidence angle of the light directly applied from the light source to the image reading target; and a switching mechanism that switches traveling of the light from the light source to an optical path for directly irradiating the image reading target or an optical path for irradiating the image reading target via the traveling change member.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present disclosure will be described with reference to the drawings.

Figure 2:
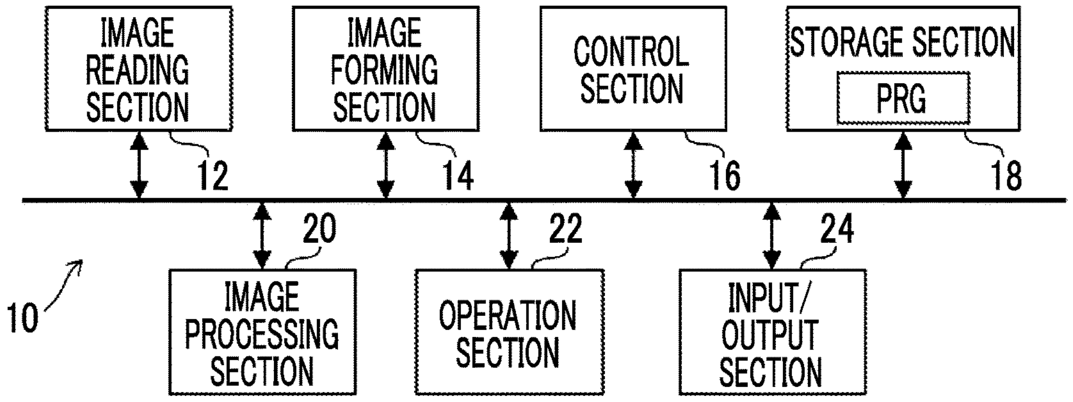
FIG. 2 is a functional block diagram of the image forming apparatus according to the exemplary embodiment of the present disclosure.

FIG. 2 is a block diagram showing a functional configuration of an image forming apparatus 10 according to the present exemplary embodiment. The image forming apparatus 10 includes an image reading section 12 and an image forming section 14.

The image reading section 12 of the present exemplary embodiment is an example of an image reading device in the present disclosure.

The image reading section 12 has a function of reading an image from an image reading target. Specifically, the image reading section 12 optically reads surface characteristics of the image reading target and generates image information representing the reading result. Examples of the image reading target include flat objects such as paper and woven fabrics. The image reading target may be a three-dimensional object. In the present exemplary embodiment, an original document M having an image on a surface thereof is used as an example of an image reading target.

The image forming section 14 has a function of forming an image on a recording medium P such as paper on the basis of the image information read by the image reading section 12.

The image forming apparatus 10 further includes a control section 16, a storage section 18, an image processing section 20, an operation section 22, and an input/output section 24.

The control section 16 has a function of controlling an operation of each unit of the image forming apparatus 10. The control section 16 of the present exemplary embodiment is configured with a computer in which a central processing unit (CPU), a read only memory (ROM), a random access memory (RAM), and the like are connected to each other to be communicable with each other via a bus. The control section 16 controls the operation of each unit of the image forming apparatus 10 by executing various programs PRG stored in the storage section 18.

The storage section 18 has a function of storing the above program PRG or the like. The storage section 18 of the present exemplary embodiment is a storage device such as a hard disk drive (HDD), a solid state drive (SSD), or a flash memory, and stores the above programs PRG or the like.

The above programs PRG may be stored in the above ROM.

The image processing section 20 has a function of performing set image processing on an image signal generated by the image reading section 12 to generate image information and outputting the image information to the image forming section 14. The image processing section 20 includes, for example, image processing circuits such as a plurality of application specific integrated circuits (ASICs) or large scale Integration (LSI), and an image memory that temporarily stores image data, and various types of image processing is executed by the respective image processing circuits.

The image processing section 20 may output image data to the input/output section 24 or the operation section 22 as necessary.

The operation section 22 has a function of sending an input instruction by an operator to the control section 16. As an example, the operation section 22 of the present exemplary embodiment includes a touch panel type display, various buttons, and the like, and displays an image on the basis of the image data output by the image processing section 20, or sends an input instruction by the operator to the control section 16.

The input/output section 24 has a function of exchanging data with an external device. That is, the input/output section 24 of the present exemplary embodiment functions as an interface device.

Image Reading Section 12

Next, the image reading section 12 will be described.

Figure 1:
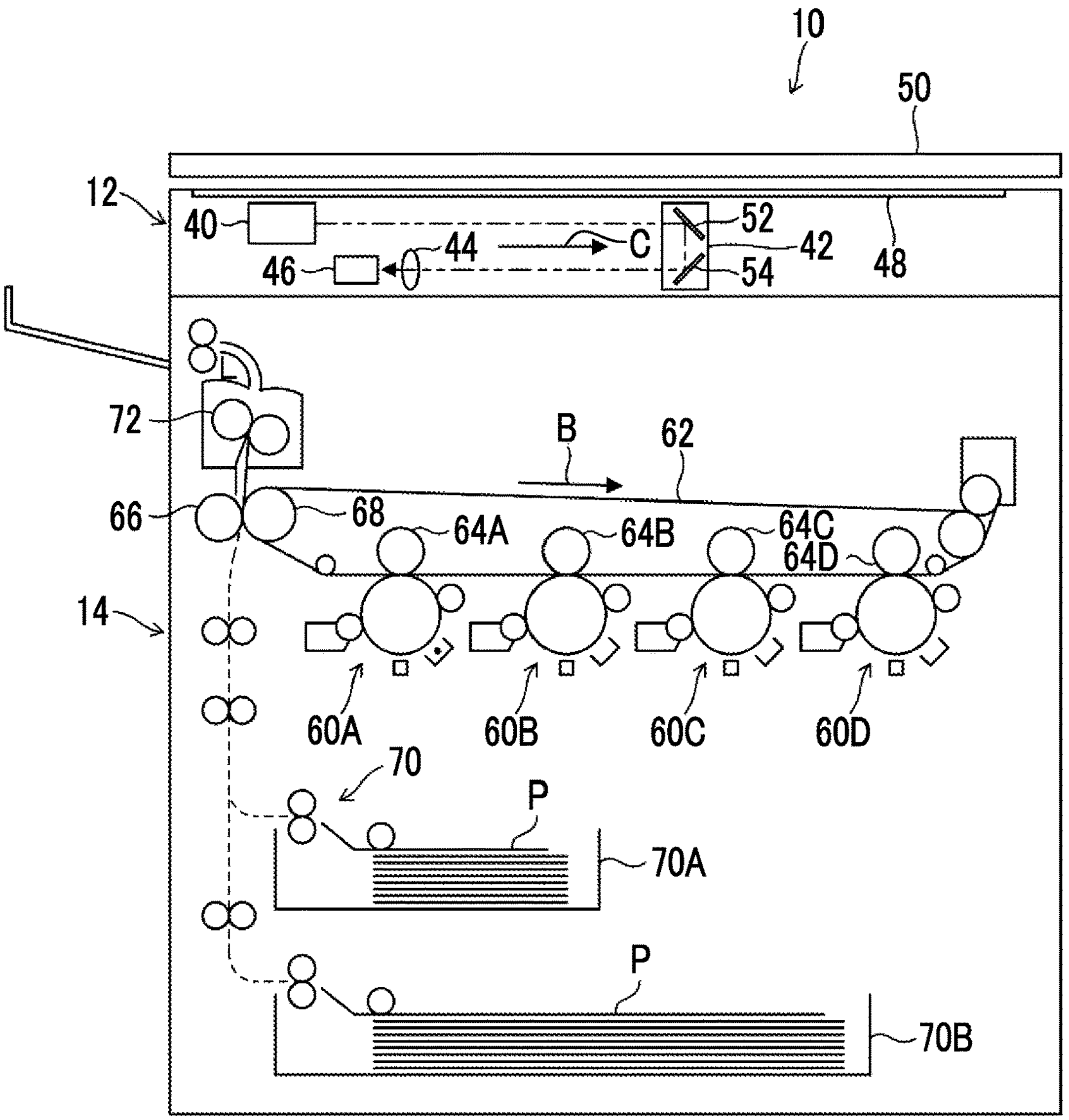
FIG. 1 is a diagram showing an apparatus configuration of an image forming apparatus according to an exemplary embodiment of the present disclosure.
Figure 3:
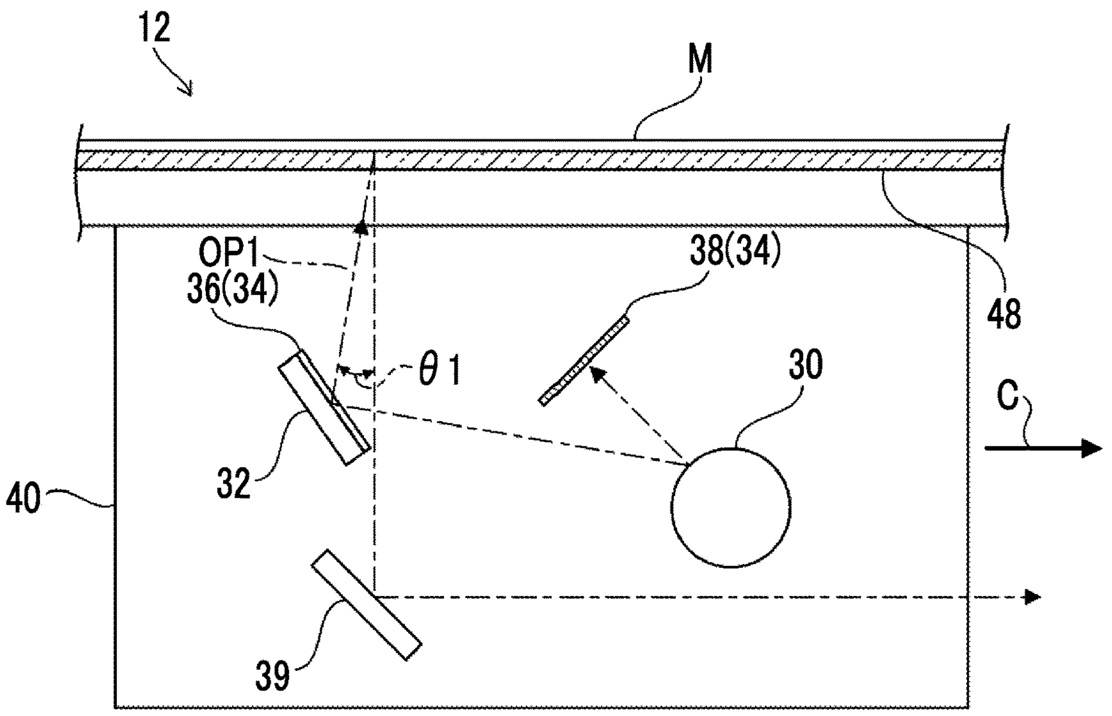
FIG. 3 is a diagram showing a device configuration of an image reading device according to the exemplary embodiment of the present disclosure, and shows a scanning operation in which light from a light source is reflected by a reflection mirror and incident to an image reading target.

FIGS. 1 and 3 show a device configuration of the image reading section 12.

The image reading section 12 includes a full-rate carriage 40, a half-rate carriage 42, an imaging optical system 44, a sensor 46, a platen glass 48, and a platen cover 50. The full-rate carriage 40 of the present exemplary embodiment is an example of a casing in the present disclosure.

As shown in FIGS. 1 and 3, the full-rate carriage 40 includes a light source 30, a mirror 32, and a switching mechanism 34, which will be described later. The full-rate carriage 40 has a function of moving in a sub-scanning direction at a predetermined speed. Specifically, the full-rate carriage 40 moves in the sub-scanning direction at a predetermined speed in a case where the light source 30 irradiates the original document M with light to read an image. In FIGS. 1 and 3, the sub-scanning direction is denoted by an arrow C. In the following description, an operation of reading the original document M while the full-rate carriage 40 moves in the sub-scanning direction will be referred to as a "scanning operation".

As shown in FIG. 1, the half-rate carriage 42 includes a mirror 52 and a mirror 54, and has a function of guiding the light from the full-rate carriage 40 to the imaging optical system 44. The half-rate carriage 42 has a function of moving in the sub-scanning direction at a predetermined speed. Specifically, the half-rate carriage 42 moves in a direction identical to the direction of the full-rate carriage 40 at half the speed of the full-rate carriage 40 in a case where the original document M is irradiated with light from the light source 30 of the full-rate carriage 40 to read an image.

The imaging optical system 44 has a function of imaging reflected light from the original document M at a position of the sensor 46. As shown in FIG. 1, the imaging optical system 44 is provided on an optical path connecting the mirror 54 to the sensor 46. The imaging optical system 44 is configured with a mirror, an imaging lens (for example, an fθ lens), and the like.

As shown in FIG. 1, the sensor 46 has a function of receiving the reflected light imaged by the imaging optical system 44 and generating an image signal according to the received light. Specifically, the sensor 46 is configured with a light receiving element such as a charge coupled device (CCD) linear image sensor or a complementary metal oxide semiconductor (CMOS) image sensor, and converts received light into a signal indicating an intensity thereof. The sensor 46 includes a color filter and generates image information representing a color of the original document M. The sensor 46 receives the reflected light and outputs the obtained image information.

As shown in FIG. 3, the platen glass 48 has a function of supporting the original document M that is an image reading target. The platen glass 48 is configured with a transparent and flat glass plate. The platen glass 48 is not limited to a glass plate, and may be, for example, an acrylic plate.

The platen cover 50 has a function of blocking external light. Specifically, as shown in FIG. 1, the platen cover 50 covers the platen glass 48 so as to block external light.

The image reading section 12 includes a light source 30, a mirror 32, and a switching mechanism 34 inside the full-rate carriage 40. The mirror 32 in the present exemplary embodiment is an example of a traveling change member in the present disclosure.

The light source 30 has a function of irradiating the original document M, which is an image reading target, with light in the present exemplary embodiment. This light source 30 is a single light source installed in the image reading section 12. In other words, the image reading section 12 has a single light source 30.

The light source 30 irradiates the original document M with light at an incidence angle θ2 from a front side of the full-rate carriage 40 in a movement direction with respect to the normal direction of the original document M. The light source 30 is fixed to the full-rate carriage 40 such that the original document M is irradiated with light at the incidence angle θ2 (in other words, the light is incident thereto). In the present exemplary embodiment, as an example, the incidence angle θ2 of the light from the light source 30 is set to 45°, but the present disclosure is not limited to this.

As the light source 30, for example, white light such as light from a fluorescent lamp or a rare gas fluorescent lamp (for example, a xenon fluorescent lamp) may be used, or a light source may be used in which plurality of white LEDs are arranged in the main scanning direction and a diffusion plate or the like is used to make a luminance distribution in the main scanning direction uniform.

As shown in FIG. 3, the mirror 32 has a function of changing a traveling direction of the light from the light source 30 and irradiating the original document M with light at the incidence angle θ1 different from the incidence angle θ2 of light directly applied to the original document M from the light source 30. The mirror 32 is provided at a position at which a main light beam of reflected light of the light applied to the original document M is not blocked. The mirror 32 is fixed to the full-rate carriage 40 such that light from the light source 30 is reflected and the original document M is irradiated with the light at the incidence angle θ1 (in other words, the light is incident thereto). In the present exemplary embodiment, as an example, the incidence angle θ1 of the light reflected by the mirror 32 is set to 5°, but the present disclosure is not limited to this.

The switching mechanism 34 has a function of switching the traveling of light from the light source 30 to an optical path OP1 (refer to FIG. 4) for directly irradiating the original document M or an optical path OP2 (refer to FIG. 3) for irradiating the original document M via the mirror 32. The switching mechanism 34 of the present exemplary embodiment includes a light blocking member that blocks an optical path from the light source 30 to the original document M, and switches optical paths for irradiating the original document M by blocking other optical paths with the light blocking member except one optical path among the plurality of optical paths. Specifically, the switching mechanism 34 has a first light blocking member 36 that blocks the optical path OP1 for directly irradiating the original document M with the light from the light source 30, and a second light blocking member 38 for the optical path OP2 for irradiating the original document M with the light from the light source 30 via the mirror 32.

Figure 4:
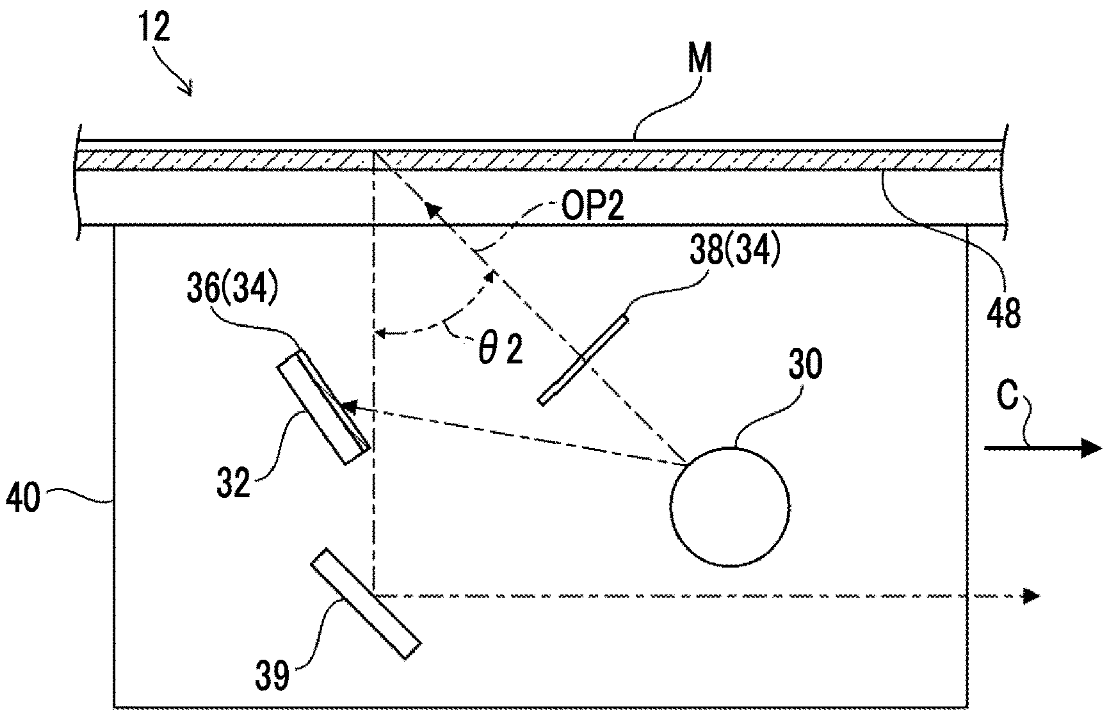
FIG. 4 is a diagram showing a device configuration of the image reading device shown in FIG. 3, and shows a scanning operation in which light from a light source is directly incident to an image reading target.

As shown in FIGS. 3 and 4, the first light blocking member 36 is disposed on a reflective surface of the mirror 32. The first light blocking member 36 is a dimming member having a function of adjusting the light transmittance. The first light blocking member 36 of the present exemplary embodiment is switched between transparent and opaque with respect to the light from the light source 30 by turning the electricity on and off. The ON/OFF control of the first light blocking member 36 is performed by the control section 16. In the present exemplary embodiment, as an example, the first light blocking member 36 is disposed on the reflective surface of the mirror 32, but the present disclosure is not limited to this, and the first light blocking member 36 may be separated from the mirror 32. That is, a position of the first light blocking member 36 is not particularly limited as long as the first light blocking member 36 is disposed on an optical path from the light source 30 to the mirror 32. As shown in FIGS. 3 and 4, the first light blocking member 36 of the present exemplary embodiment is a film-shaped or plate-shaped member, but a shape thereof is not particularly limited as long as the first light blocking member 36 has a function of blocking light from the light source 30.

As shown in FIGS. 3 and 4, the second light blocking member 38 is disposed on the optical path from the light source 30 to the original document M. The second light blocking member 38 is a dimming member having a function of adjusting the light transmittance. The second light blocking member 38 of the present exemplary embodiment can be switched between transparent and opaque with respect to the light from the light source 30 by turning the electricity on and off. ON/OFF control of the second light blocking member 38 is performed by the control section 16. As shown in FIGS. 3 and 4, the second light blocking member 38 of the present exemplary embodiment is a film-shaped or plate-shaped member, but a shape thereof is not particularly limited as long as the second light blocking member 38 has a function of blocking light from the light source 30.

A mirror 39 is provided inside the full-rate carriage 40. The mirror 39 reflects reflected light from the original document M to the half-rate carriage 42. This reflected light is guided to the imaging optical system 44 via the mirror 52 and the mirror 54.

The term “mirror” in the present exemplary embodiment refers to a total reflection mirror.

The image reading section 12 of the present exemplary embodiment has a function of reading image information a plurality of times by changing an incidence angle of light with respect to the original document M. Specifically, the image reading section 12 performs a first scanning operation that is a scanning operation in which light from the light source 30 is reflected by a mirror 32 and incident to the original document M and reading is performed by using the reflected light from the original document M, and a second scanning operation that is a scanning operation in which light from the light source 30 is directly incident to the original document M and reading is performed by using the reflected light from the original document M. A reflection component of the reflected light obtained through the first scanning operation mainly represents a texture of the original document M. On the other hand, a reflection component of the reflected light obtained through the second scanning operation mainly represents a color of the original document M. The texture referred to here includes glossiness or roughness of the original document M.

The image reading section 12 of the present exemplary embodiment executes two scanning operations, that is, the first scanning operation and the second scanning operation, and combines image signals obtained through the respective scanning operations to generate image information. The image information obtained as described above expresses both a color and a texture of the original document M.

Figure 5:
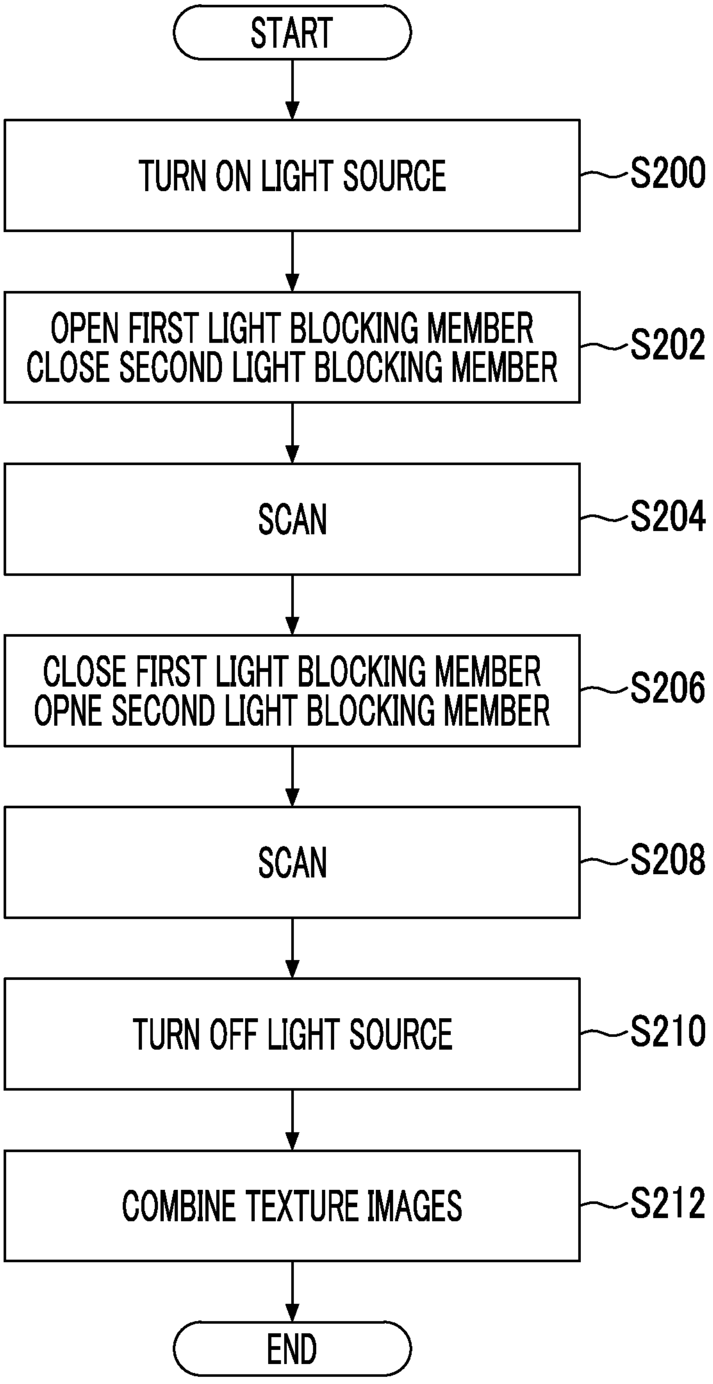
FIG. 5 is a flowchart for describing a flow of acquiring image information indicating a texture from an image reading target by using the image reading device according to the exemplary embodiment of the present disclosure.

Next, an example of a method of acquiring image information indicating a texture from the original document M by using the image reading section 12 will be described. FIG. 5 shows a flowchart showing a process of acquiring image information indicating a texture from the original document M using the image reading section 12. In the following description, an operation of each unit configuring the image reading section 12 is controlled by the control section 16.

In step S200, the light source 30 is turned on.

In step S202, an optical path of the light from the light source 30 is switched to the optical path OP1 by the switching mechanism 34. Specifically, the optical path OP1 is opened by the first light blocking member 36, and the optical path OP2 is blocked and closed by the second light blocking member 38. That is, the first light blocking member 36 becomes transparent through electric control and transmits light therethrough, and the second light blocking member 38 becomes opaque through electric control and blocks transmission of light.

In step S204, the light from the light source 30 is incident to the original document M through the optical path OP1 at the incidence angle θ1, and in that state, the full-rate carriage 40 moves in the sub-scanning direction and thus the original document M is scanned. The scanning operation executed in this step is the above first scanning operation. An image signal obtained through the first scanning operation is sent to the image processing section 20. In a case where the scanning in this step is completed, the process proceeds to step S206.

In step S206, the optical path of the light from the light source 30 is switched to the optical path OP2 by the switching mechanism 34. Specifically, the optical path OP1 is blocked by the first light blocking member 36 to be closed, and the optical path OP2 is opened by the second light blocking member 38. That is, the second light blocking member 38 becomes transparent through electric control and transmits light therethrough, and the first light blocking member 36 becomes opaque through electric control and blocks the transmission of light.

In step S208, the light from the light source 30 is incident to the original document M through the optical path OP2 at the incidence angle θ2, and in that state, the full-rate carriage 40 moves in the sub-scanning direction and the original document M is scanned. The scanning operation executed in this step is the above second scanning operation. An image signal obtained through the second scanning operation is sent to the image processing section 20. In a case where the scanning in this step is completed, the process proceeds to step S210.

In step S210, the light source 30 is turned off.

In step S212, the image signal obtained through the first scanning operation and the image signal obtained through the second scanning operation are combined to generate information regarding a textured image.

As described above, in the present exemplary embodiment, image information indicating a texture can be acquired from the original document M. Here, the image signal obtained through the first scanning operation is an image signal for detecting a texture of the original document M. The image signal obtained through the second scanning operation is an image signal for detecting the color information of the original document M. Consequently, the image information obtained by combining the first image signal and the second image signal becomes image information that can express a color of the original document M and a texture of the original document M. As a result, the color and the texture can be read more accurately from the original document M.

In a case where the image reading section 12 reads the original document M described above, the second scanning operation is executed after the first scanning operation, but the present disclosure is not limited to this, and the first scanning operation may be executed after the second scanning operation. Even in this case, it is possible to generate information regarding a textured image.

Image Forming Section 14

Next, the image forming section 14 will be described. As shown in FIG. 1, the image forming section 14 of the present exemplary embodiment includes image forming units 60A, 60B, 60C, and 60D, an intermediate transfer belt 62, primary transfer rolls 64A, 64B, 64C, and 64D, a secondary transfer roll 66, a backup roll 68, a paper feeding unit 70, and a fixing unit 72.

The intermediate transfer belt 62 is an endless belt member that is circulated in a direction of an arrow B in the drawing.

The primary transfer rolls 64A, 64B, 64C, and 64D are biased toward photoconductor drums of the image forming units 60A, 60B, 60C, and 60D via the intermediate transfer belt 62. Toner images (that is, developer images) are formed on these photoconductor drums, and the toner images are transferred to the intermediate transfer belt 62.

The secondary transfer roll 66 and the backup roll 68 are mutually biased at a position where the intermediate transfer belt 62 faces the recording medium P such as paper, and a toner image is transferred from the intermediate transfer belt 62 to the recording medium P.

The paper feeding unit 70 includes paper trays 70A and 70B accommodating various recording media P, and supplies the recording medium P at the time of image formation.

The fixing unit 72 includes a roll member r heating and pressurizing the recording medium P, and fixes the toner image transferred to the surface of the recording medium P with heat and pressure.

As described above, the image forming section 14 forms an image on the recording medium P by using toner of each color.

Next, an operation of the present exemplary embodiment will be described.

In the image reading section 12 of the present exemplary embodiment, by using the switching mechanism 34, traveling of light from the single light source 30 is switched to the optical path OP2 for directly irradiating the original document M or the optical path OP1 for irradiating the original document M via the mirror 32. Therefore, the image reading section 12 of the present exemplary embodiment can obtain image information indicating a texture even in a case where a plurality of light sources are not provided. That is, according to the image reading section 12, incidence angles to the original document M may be switched (optical paths can be switched) even with a single light source compared with a configuration in which light is incident to the original document M from a plurality of light sources at different angles, and thus the cost of a device can be reduced.

In the image reading section 12 of the present exemplary embodiment, the single light source 30 is used. Therefore, for example, it is not necessary to consider the influence of the variation in the chromaticity of each light source as compared with the configuration including a plurality of light sources, and the image processing can be simplified.

In the image reading section 12 of the present exemplary embodiment, the optical paths OP1 and OP2 from the light source 30 to the original document M are switched by the first light blocking member 36 and the second light blocking member 38 included in the switching mechanism 34. As described above, the image reading section 12 may suppress variations in incidence angles of light with respect to the original document M compared with a configuration in which the light source 30 moves in a direction intersecting the main scanning direction in the full-rate carriage 40.

In the image reading section 12 of the present exemplary embodiment, the light source 30 and the mirror 32 are fixed to the full-rate carriage 40. Therefore, the image reading section 12 can more effectively suppress variations in incidence angles of light to the original document M compared with the configuration in which the light source 30 moves in the direction intersecting the main scanning direction in the full-rate carriage 40.

In the image reading section 12 of the present exemplary embodiment, since an image signal is obtained by executing a plurality of scanning operations with different incidence angles of light to the original document M, for example, a texture of the original document M may be read compared with a configuration in which an image signal is obtained by executing the plurality of scanning operations with a single incidence angle.

In the image forming apparatus 10 of the present exemplary embodiment, a textured image is read from the original document M by the image reading section 12. The image forming section 14 forms an image on the recording medium on the basis of information regarding the read textured image. As described above, according to the image forming apparatus 10, a textured image is formed on the recording medium P.

Other Exemplary Embodiments

The image reading section 12 of the above exemplary embodiment executes two scanning operations such as the first scanning operation and the second scanning operation, but the present disclosure is not limited to this configuration. For example, the full-rate carriage 40 may be provided with a mirror that reflects light from the light source 30 and irradiates the original document M with light at an incidence angle different from the incidence angles 81 and 82, and a third scanning operation may be executed on the basis of reflected light of light emitted from the mirror to the original document M. As described above, by executing a plurality of scanning operations with a plurality of incidence angles, it is possible to obtain information regarding a more textured image.

Image Reading Section 82

Figure 6:
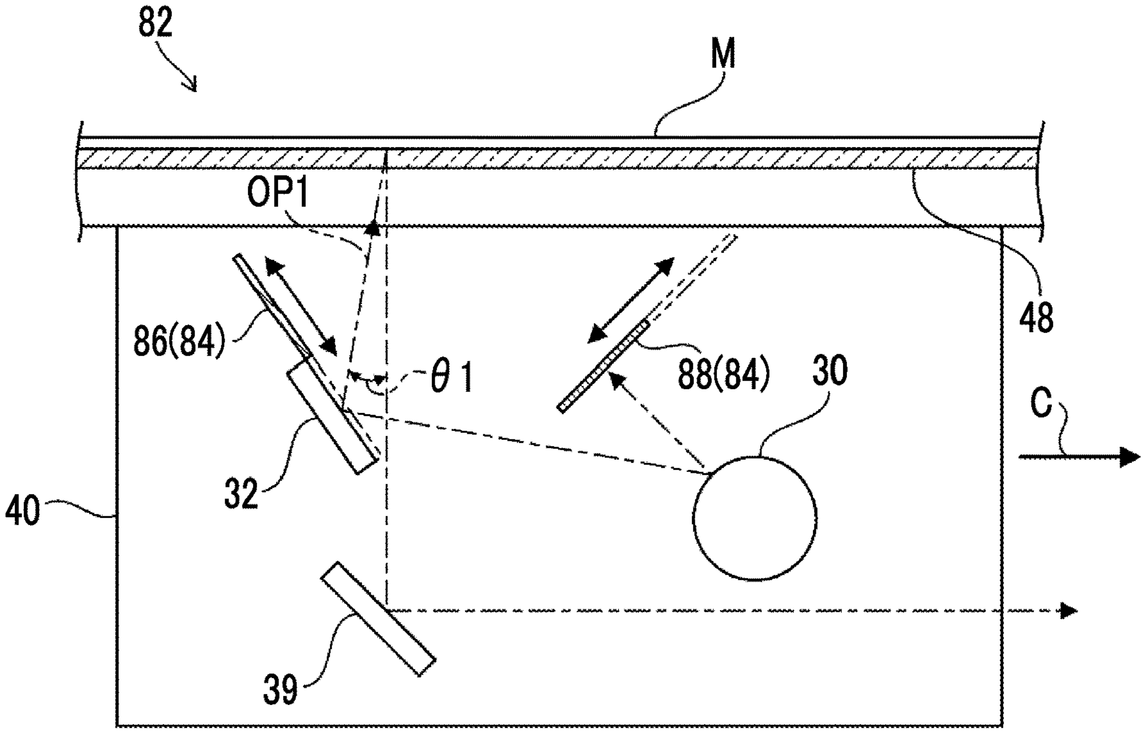
FIG. 6 is a diagram showing a device configuration of an image reading device according to another exemplary embodiment of the present disclosure.

In the image reading section 12 of the above exemplary embodiment, the optical path OP1 and the optical path OP2 are switched by the switching mechanism 34, but the present disclosure is not limited to this. For example, as in an image reading section 82 shown in FIG. 6, the optical path OP1 and the optical path OP2 may be switched by a switching mechanism 84. The switching mechanism 84 includes a first light blocking member 86 and a second light blocking member 88. The first light blocking member 86 and the second light blocking member 88 are members (opaque members) that do not transmit light, respectively. The first light blocking member 86 is slidable to a light blocking position at which the optical path OP1 is blocked and a retracted position that is retracted from the light blocking position. The second light blocking member 88 is slidable to a light blocking position that blocks the optical path OP2 and a retracted position that is retracted from the light blocking position. The sliding movement of the first light blocking member 86 and the sliding movement of the second light blocking member 88 are performed by a drive force from a drive unit (not shown) provided in each thereof. An operation of the switching mechanism 84 is controlled by the control section 16. As described above, an angle (width) of light directly directed from the light source 30 to the original document M can be adjusted by subjecting the first light blocking member 86 and the second light blocking member 88 to sliding movement. An angle (width) of light directed from the light source 30 to the original document M via the mirror 32 can be adjusted.

Image Reading Section 92

Figure 7:
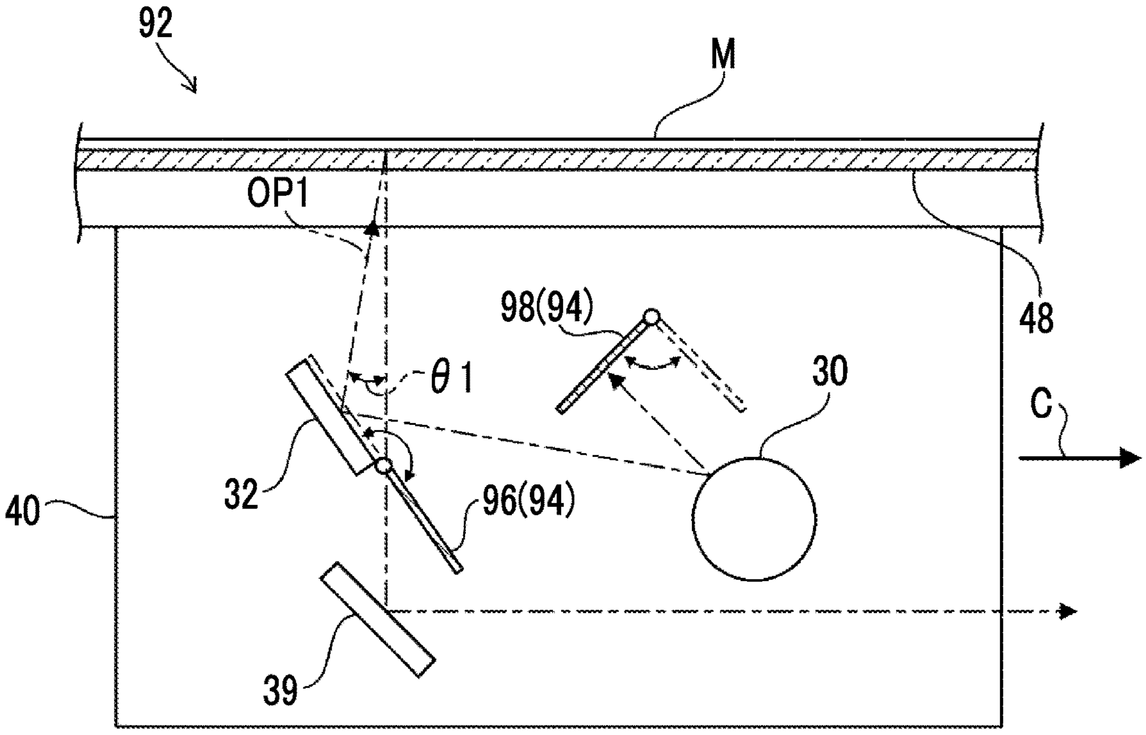
FIG. 7 is a diagram showing a device configuration of an image reading device according to still another exemplary embodiment of the present disclosure.

As in an image reading section 92 shown in FIG. 7, the optical path OP1 and the optical path OP2 may be switched by a switching mechanism 94. The switching mechanism 94 includes a first light blocking member 96 and a second light blocking member 98. Each of the first light blocking member 96 and the second light blocking member 98 is a member (opaque member) through which light is not transmitted. The first light blocking member 96 is rotationally movable to a light blocking position at which the optical path OP1 is blocked and a retracted position that is retracted from the light blocking position. The second light blocking member 98 is rotationally movable to a light blocking position at which the optical path OP2 is blocked and a retracted position that is retracted from the light blocking position. The rotational movement of the first light blocking member 96 and the rotational movement of the second light blocking member 98 are performed by a drive force from a drive unit (not shown) provided in each thereof. An operation of the switching mechanism 94 is controlled by the control section 16. As described above, an angle (width) of light directly directed from the light source 30 to the original document M can be adjusted by rotationally moving the first light blocking member 96 and the second light blocking member 98. An angle (width) of light directed from the light source 30 to the original document M via the mirror 32 can be adjusted.

Image Reading Section 102

In the image reading section 12 of the above exemplary embodiment, the light source 30 is fixed in the full-rate carriage 40, and the optical path OP1 and the optical path OP2 are switched by the switching mechanism 34 including the first light blocking member 36 and the second light blocking member 38, but the present disclosure is not limited to this configuration. For example, as in an image reading section 102 shown in FIGS. 8 and 9, the optical path OP1 and the optical path OP2 may be switched by a switching mechanism 104.

Figure 8:
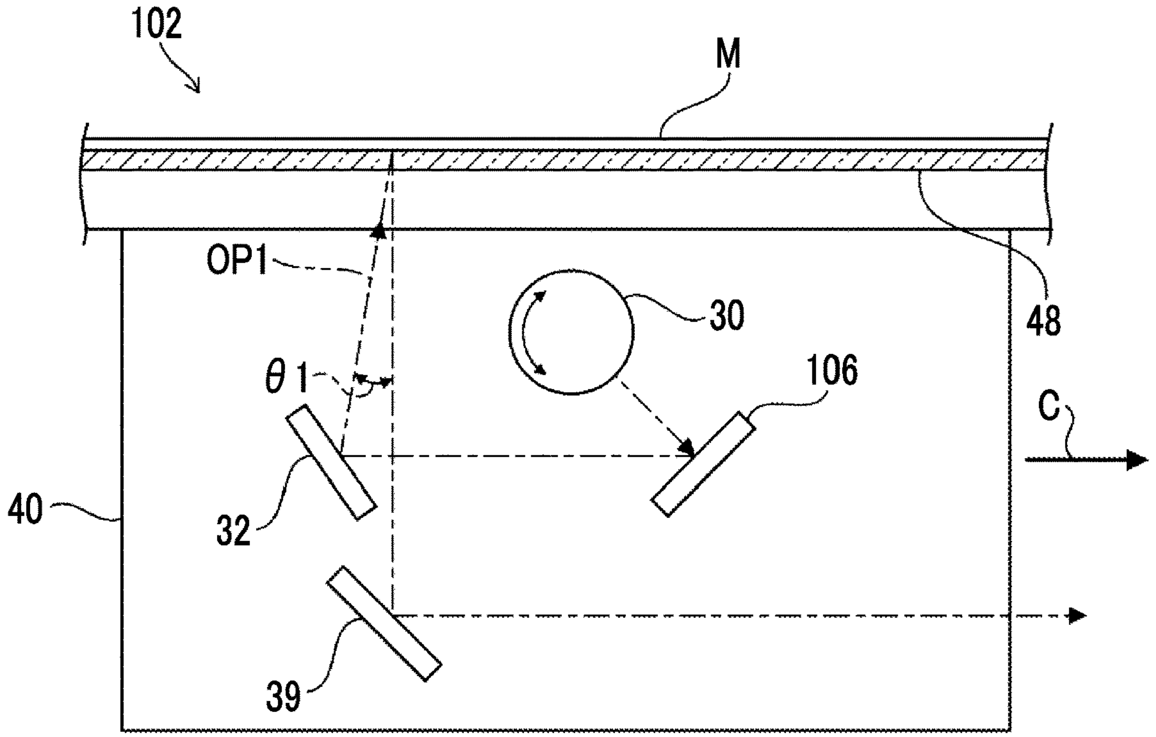
FIG. 8 is a diagram showing a device configuration of an image reading device according to still another exemplary embodiment of the present disclosure, and shows a scanning operation in which light from a light source is reflected by a reflection mirror and incident to an image reading target.
Figure 9:
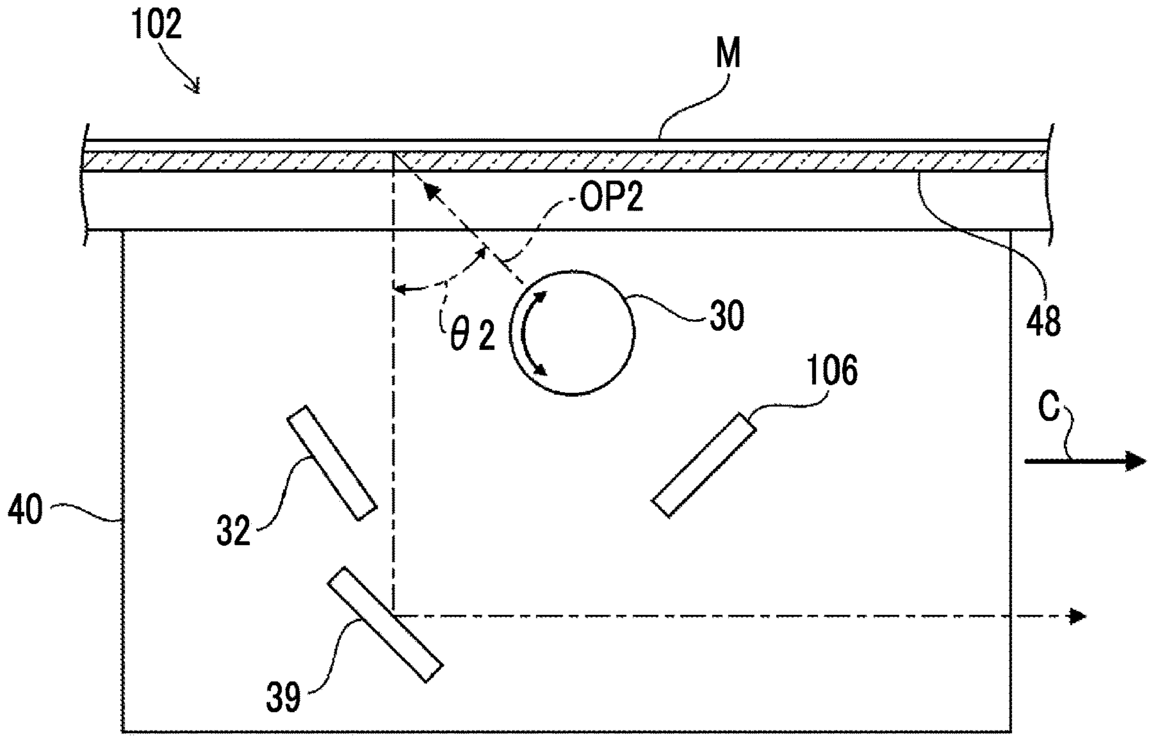
FIG. 9 is a diagram showing a device configuration of the image reading device shown in FIG. 8, and shows a scanning operation in which light from a light source is directly incident to an image reading target.

Specifically, the image reading section 102 includes a light source 30, a mirror 32, a mirror 106, and a mirror 39 inside the full-rate carriage 40. The mirror 32 and the mirror 106 are examples of traveling change members in the present disclosure. The light source 30 is rotatable by the switching mechanism 104 with the sub-scanning direction as an axial direction. When the light source 30 is located at a first rotation position as shown in FIG. 8, light from the light source 30 is emitted from the mirror 106 to the original document M via the mirror 32. Here, when the light source 30 is located at the first rotation position, light is incident to the original document M at the incidence angle θ1. On the other hand, when the light source 30 is located at a second rotation position as shown in FIG. 9, light from the light source 30 is applied to the original document M at the incidence angle θ2.

The switching mechanism 104 has a function of switching traveling of light from the light source 30 to the optical path OP2 (refer to FIG. 9) for directly irradiating the original document M or the optical path OP1 (refer to FIG. 8) for irradiating the original document M via the mirror 106 and the mirror 32. The switching mechanism 104 of the present exemplary embodiment includes a rotation drive section 108 that rotates the light source 30 with the sub-scanning direction as the axial direction, and changes an irradiation direction of light from the light source 30 by driving the rotation drive section 108 to switch traveling of the light from the light source 30 to the optical path OP1 or the optical path OP2. As the rotation drive section 108, for example, an electric motor is used.

Figure 10:
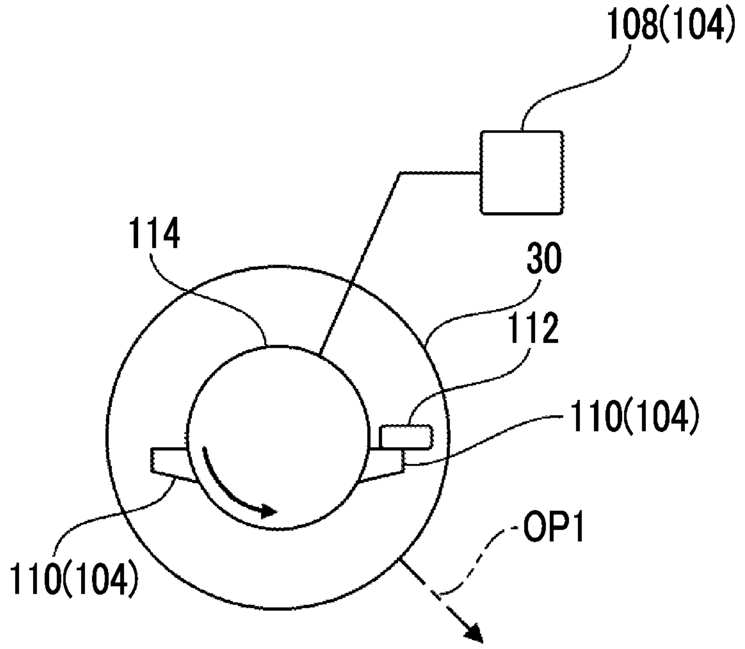
FIG. 10 is a diagram showing a state in which the light source used in the image reading device shown in FIG. 8 is stopped at a first rotation position.
Figure 11:
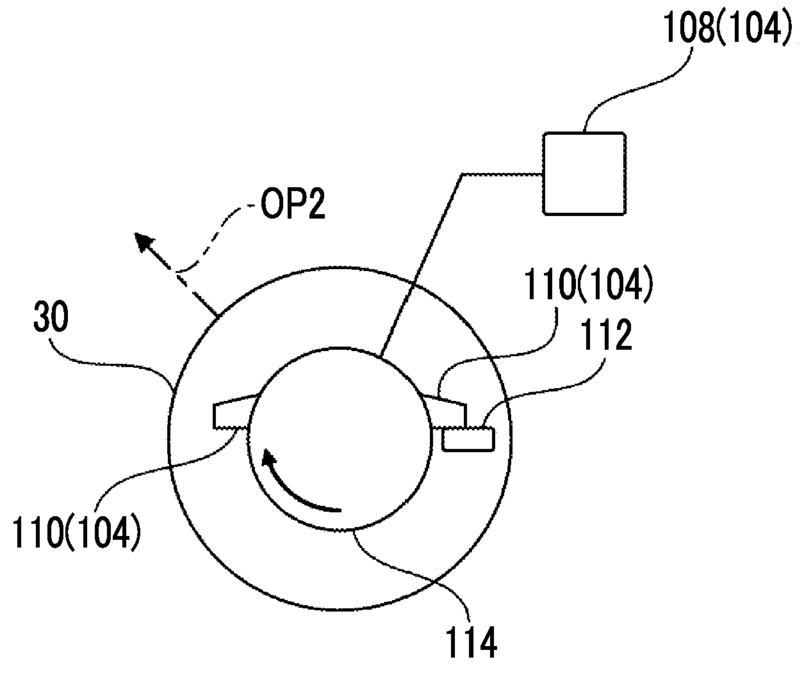
FIG. 11 is a diagram showing a state in which the light source used in the image reading device shown in FIG. 8 is stopped at a second rotation position.

The switching mechanism 104 includes a contact portion 110 provided on the light source 30, and a contact target portion 112 provided on the full-rate carriage 40 and coming in contact with the rotated light source 30. In a case where the light source 30 is rotated, the contact portion 110 of the light source 30 comes into contact with the contact target portion 112 of the full-rate carriage 40, and thus rotation of the light source 30 is stopped. Consequently, the irradiation direction of the light from the light source 30 is fixed. Specifically, as shown in FIGS. 10 and 11, the light source 30 is provided with a rotation shaft 114, and the contact portion 110 is a protrusion protruding from an outer circumference of an end part of the rotation shaft 114, and is provided at two locations with a gap in a circumferential direction of the rotation shaft 114. Due to the rotation of the light source 30, one of the contact portions 110 comes into contact with the contact target portion 112 provided in the full-rate carriage 40, and the light source 30 is stopped at the first rotation position (refer to FIG. 10). On the other hand, in a case where the light source 30 is rotated in the opposite direction from the first rotation position (rotated clockwise in FIG. 11), the other contact portion 110 comes into contact with the contact target portion 112 provided in the full-rate carriage 40, and the light source 30 is stopped at the second rotation position.

The mirror 32, the mirror 106, and the mirror 39 are fixed to the full-rate carriage 40.

Figure 12:
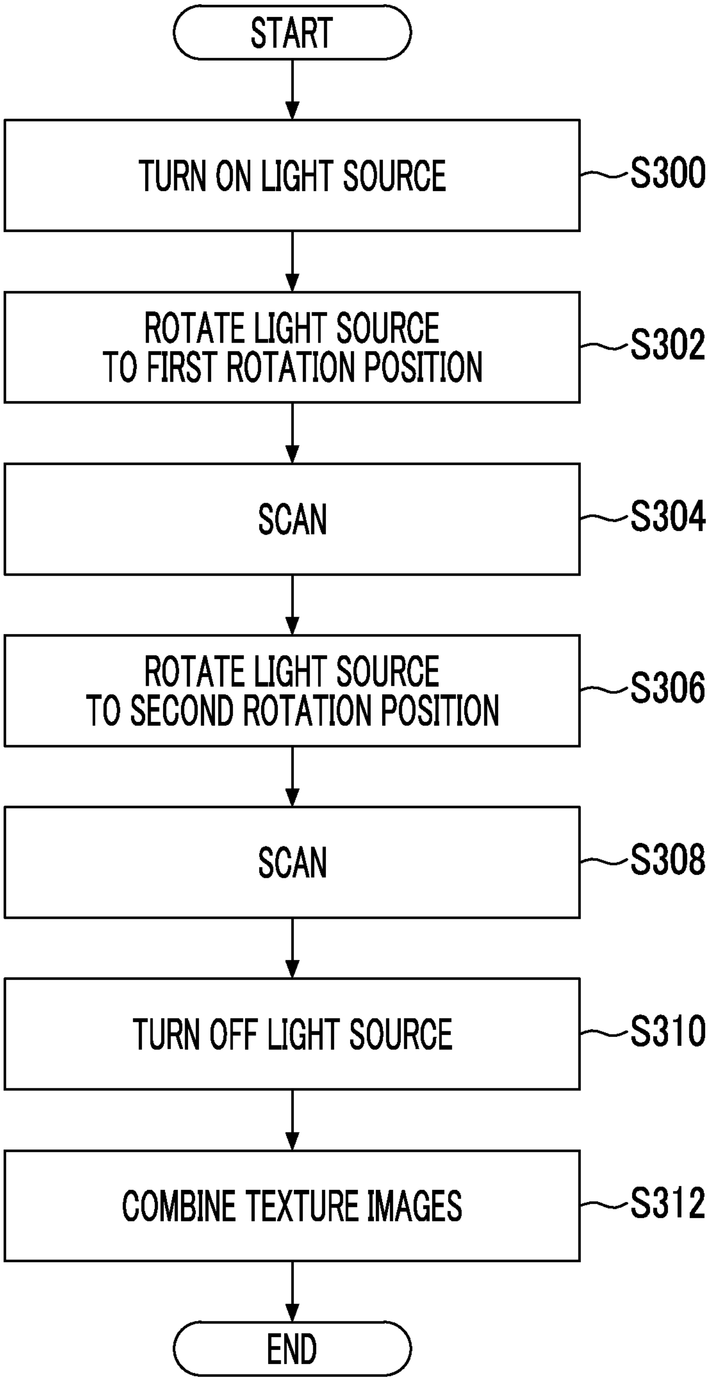
FIG. 12 is a flowchart for describing a flow of acquiring image information indicating a texture from an image reading target by using the image reading device shown in FIG. 8.

Next, an example of a method of acquiring image information indicating a texture from the original document M by using the image reading section 102 will be described. FIG. 12 is a flowchart showing a process of acquiring image information indicating a texture from the original document M using the image reading section 102. In the following description, an operation of each unit configuring the image reading section 102 is controlled by the control section 16.

In step S300, the light source 30 is turned on.

In step S302, an optical path of light from the light source 30 is switched to the optical path OP1 by the switching mechanism 104. Specifically, the light source 30 is rotated toward the first rotation position and is stopped at the first rotation position.

In step S304, the light from the light source 30 is incident to the original document M through the optical path OP1 at the incidence angle θ1, and in this state, the full-rate carriage 40 moves in the sub-scanning direction such that the original document M is scanned. The scanning operation executed in this step is the first scanning operation. An image signal obtained through the first scanning operation is sent to the image processing section 20. In a case where the scanning in this step is completed, the process proceeds to step S306.

In step S306, the optical path of the light from the light source 30 is switched to the optical path OP2 by the switching mechanism 104. Specifically, the light source 30 is rotated toward the second rotation position and is stopped at the second rotation position.

In step S308, the light from the light source 30 is incident to the original document M through the optical path OP2 at the incidence angle θ2, and in this state, the full-rate carriage 40 moves in the sub-scanning direction such that the original document M is scanned. The scanning operation executed in this step is the second scanning operation. An image signal obtained through the second scanning operation is sent to the image processing section 20. In a case where the scanning in this step is completed, the process proceeds to step S310.

In step S310, the light source 30 is turned off.

In step S312, the image signal obtained through the first scanning operation and the image signal obtained through the second scanning operation are combined to generate information regarding a textured image.

As described above, the image reading section 102 can acquire image information indicating a texture from the original document M, similarly to the image reading section 12.

In the image reading section 102, the light source 30 is rotated with respect to the full-rate carriage 40 by the switching mechanism 104, but the light source 30 is configured to bring the contact portion 110 into contact with the contact target portion 112 and stop the light source 30 at a predetermined rotation position is provided, and thus variations in incidence angles of light to the original document M may be suppressed compared with the configuration in which the light source 30 is moved in a direction intersecting the main scanning direction with respect to the full-rate carriage 40. In the image reading section 102, the cost of the device can be reduced as in the image reading section 12.

The image reading section of the above exemplary embodiment uses a mirror (total reflection mirror) as an example of a traveling change member, but the present disclosure is not limited to this configuration. For example, a prism mirror may be used as an example of the traveling change member. Respective surfaces of the prism mirror may be a mirror layer, a half mirror layer, and an antireflection layer, and an optical path of light for the original document M may be switched by rotating the prism mirror with a switching mechanism.

The image forming section 14 of the above exemplary embodiment is a tandem system including four image forming units, but the present disclosure is not limited to this. The image forming section 14 may be a rotary type image forming section. A paper transport belt may be provided instead of the intermediate transfer belt, and the transfer may be performed directly from a photoconductor drum to the recording medium P without performing transfer to an intermediate transfer body (intermediate transfer belt).

In the above exemplary embodiment, the image reading section 12 is provided on the upper part of the image forming apparatus 10, but the present disclosure is not limited to this. The image reading section 12, the control section 16, the storage section 18, and the image processing section 20 may form an image reading device.

In the above exemplary embodiment, the full-rate carriage 40 moves in the sub-scanning direction to irradiate the original document M placed on the platen glass 48 with light, but the present disclosure is not limited to this. For example, the original document M may be moved in the sub-scanning direction with respect to the full-rate carriage 40 and be irradiated with light.

In the above exemplary embodiment, the lower surface of the original document M placed on the platen glass 48 is irradiated with light, but the present disclosure is not limited to this configuration. For example, the original document M placed on the platen may be irradiated with light from the full-rate carriage 40 moving above the original document M in the sub-scanning direction toward the upper surface of the original document M.

The present disclosure is not limited to the above exemplary embodiment, and various modifications, changes, and improvements can be made without departing from the concept thereof. For example, the above modification examples may be configured by combining a plurality of the modification examples as appropriate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:

a single light source that irradiates an image reading target with light, wherein the single light source comprises a lamp or a plurality of light emitting diodes;

a mirror that changes a traveling direction of the light from the light source and irradiates the image reading target with the light at an incidence angle different from an incidence angle of the light directly applied from the light source to the image reading target; and a switching mechanism that switches traveling of the light from the light source to an optical path for directly irradiating the image reading target or an optical path for irradiating the image reading target via the mirror, wherein the switching mechanism comprises a first light blocking member and a second light blocking member, the first light blocking member is disposed on the optical path for irradiating the image reading target via the mirror, and the second light blocking member is disposed on the optical path for directly irradiating the image reading target, each of the first light blocking member and the second light blocking member is a dimming member or an opaque member, the first light blocking member is configured to be movable to a first light blocking position at which the optical path for irradiating the image reading target via the mirror is blocked and a first retracted position that is retracted from the first light blocking position, and the second light blocking member is configured to be movable to a second light blocking position at which the optical path for directly irradiating the image reading target is blocked and a second retracted position that is retracted from the second light blocking position.

2. The image reading device according to claim 1, wherein the first light blocking member and the second light blocking member block an optical path from the light source to the image reading target, and switch optical paths for irradiating the image reading target by blocking, except one optical path among a plurality of the optical paths, the other optical paths with the first light blocking member and the second light blocking member.

3. The image reading device according to claim 1, further comprising:

a casing that moves relative to the image reading target in a main scanning direction and a sub-scanning direction, wherein the light source and the mirror are fixed to the casing.

4. The image reading device according to claim 2, further comprising:

a casing that moves relative to the image reading target in a main scanning direction and a sub-scanning direction, wherein the light source and the mirror are fixed to the casing.

5. The image reading device according to claim 1, wherein image information is read a plurality of times by changing an incidence angle of the light to the image reading target.

6. The image reading device according to claim 2, wherein image information is read a plurality of times by changing an incidence angle of the light to the image reading target.

7. The image reading device according to claim 3, wherein image information is read a plurality of times by changing an incidence angle of the light to the image reading target.

8. The image reading device according to claim 4, wherein image information is read a plurality of times by changing an incidence angle of the light to the image reading target.

9. An image forming apparatus comprising:

the image reading device according to claim 1 that reads an image from an original document that is the image reading target; and an image forming section that forms an image on a recording medium on the basis of information regarding the read image, wherein the image forming section comprises a transfer roll.

10. A non-transitory computer readable medium storing an image reading program causing a computer to execute a process of:

irradiating an image reading target with light from a single light source, wherein the single light source comprises a lamp or a plurality of light emitting diodes;

changing a traveling direction of the light from the light source via a mirror and irradiating the image reading target with the light at an incidence angle different from an incidence angle of the light directly applied from the light source to the image reading target; and switching traveling of the light from the light source to an optical path for directly irradiating the image reading target or an optical path for irradiating the image reading target via the mirror, wherein the switching mechanism comprises a first light blocking member and a second light blocking member, the first light blocking member is disposed on the optical path for irradiating the image reading target via the mirror, and the second light blocking member is disposed on the optical path for directly irradiating the image reading target, each of the first light blocking member and the second light blocking member is a dimming member or an opaque member, the switching traveling of the light from the light source to the optical path for irradiating the image reading target via the mirror is performed by using the first light blocking member to open the optical path for irradiating the image reading target via the mirror, and by using the second light blocking member to block the optical path for directly irradiating the image reading target, the switching traveling of the light from the light source to the optical path for directly irradiating the image reading target is performed by using the first light blocking member to block the optical path for irradiating the image reading target via the mirror, and by using the second light blocking member to open the optical path for directly irradiating the image reading target, the first light blocking member is movable to a first light blocking position at which the optical path for irradiating the image reading target via the mirror is blocked and a first retracted position that is retracted from the first light blocking position, and the second light blocking member is movable to a second light blocking position at which the optical path for directly irradiating the image reading target is blocked and a second retracted position that is retracted from the second light blocking position.

11. An image reading method comprising:

irradiating an image reading target with light from a single light source, wherein the single light source comprises a lamp or a plurality of light emitting diodes;

changing a traveling direction of the light from the light source via a mirror and irradiating the image reading target with the light at an incidence angle different from an incidence angle of the light directly applied from the light source to the image reading target; and switching traveling of the light from the light source to an optical path for directly irradiating the image reading target or an optical path for irradiating the image reading target via the mirror, wherein the switching mechanism comprises a first light blocking member and a second light blocking member, the first light blocking member is disposed on the optical path for irradiating the image reading target via the mirror, and the second light blocking member is disposed on the optical path for directly irradiating the image reading target, each of the first light blocking member and the second light blocking member is a dimming member or an opaque member, the switching traveling of the light from the light source to the optical path for irradiating the image reading target via the mirror is performed by using the first light blocking member to open the optical path for irradiating the image reading target via the mirror, and by using the second light blocking member to block the optical path for directly irradiating the image reading target, the switching traveling of the light from the light source to the optical path for directly irradiating the image reading target is performed by using the first light blocking member to block the optical path for irradiating the image reading target via the mirror, and by using the second light blocking member to open the optical path for directly irradiating the image reading target, the first light blocking member is movable to a first light blocking position at which the optical path for irradiating the image reading target via the mirror is blocked and a first retracted position that is retracted from the first light blocking position, and the second light blocking member is movable to a second light blocking position at which the optical path for directly irradiating the image reading target is blocked and a second retracted position that is retracted from the second light blocking position.

* * * * *